DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1366

T889,018
PHOTOGRAPHIC COLOR REVERSAL PROCESS

William R. Weller, 1669 Lake Ave.,
Rochester, N.Y. 14650

Filed Sept. 25, 1970, Ser. No. 75,788
Int. Cl. G03c *5/32, 5/50*
U.S. Cl. 96—59
No Drawing. 4 Pages Specification

Improvement in image sharpness in reversal color processes is obtained by carrying out the initial black-and-white development step, bleaching and removing the resultant silver images using a non-hardening bleach solution such as acid copper sulfate or acid permanganate bleaching solutions, and after color development, bleaching the reversal developed silver with a bleach solution hardening the emulsion layers in the region of the silver.